(12) United States Patent
Cairns

(10) Patent No.: US 9,116,323 B2
(45) Date of Patent: Aug. 25, 2015

(54) PRESSURE-BALANCED SUBSEA ENCLOSURE WITH ELASTOMERIC FILL MATERIAL

(71) Applicant: Teledyne Instruments, Inc., Thousand Oaks, CA (US)

(72) Inventor: James Cairns, Ormand Beach, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 49 days.

(21) Appl. No.: 13/833,461

(22) Filed: Mar. 15, 2013

(65) Prior Publication Data

US 2014/0270674 A1 Sep. 18, 2014

(51) Int. Cl.
| | |
|---|---|
| *G02B 6/00* | (2006.01) |
| *G02B 6/44* | (2006.01) |
| *H02G 15/115* | (2006.01) |
| *H02G 15/14* | (2006.01) |
| *H02G 15/00* | (2006.01) |
| *H02G 15/007* | (2006.01) |
| *H02G 15/013* | (2006.01) |

(52) U.S. Cl.
CPC .............. *G02B 6/4441* (2013.01); *H02G 15/115* (2013.01); *H02G 15/003* (2013.01); *H02G 15/007* (2013.01); *H02G 15/013* (2013.01); *H02G 15/14* (2013.01)

(58) Field of Classification Search
CPC ........................................ G02B 6/4427
See application file for complete search history.

(56) References Cited

U.S. PATENT DOCUMENTS

| | | | |
|---|---|---|---|
| 3,972,581 A | | 8/1976 | Oldham |
| 4,005,922 A | | 2/1977 | Burkhart et al. |
| 4,118,861 A | | 10/1978 | Palmisano |
| 4,210,774 A | * | 7/1980 | Perry ........................ 174/140 R |
| 4,439,561 A | | 3/1984 | Barber |
| 4,454,375 A | * | 6/1984 | Takaoka et al. ............... 174/73.1 |
| 4,519,662 A | | 5/1985 | Riley et al. |
| 4,606,603 A | * | 8/1986 | Cairns ............................ 385/58 |
| 4,621,168 A | | 11/1986 | Bryant et al. |
| 4,701,014 A | | 10/1987 | Bonicel |
| 4,728,296 A | | 3/1988 | Stamm |
| 4,761,831 A | | 8/1988 | Davis et al. |

(Continued)

FOREIGN PATENT DOCUMENTS

| | | |
|---|---|---|
| CN | 2879490 Y | 3/2007 |
| CN | 1992463 A | 7/2007 |

(Continued)

OTHER PUBLICATIONS

International Search Report and Written Opinion for PCT/US2012/038265 mailed on Oct. 16, 2012.

(Continued)

*Primary Examiner* — Uyen Chau N Le
*Assistant Examiner* — Chad Smith
(74) *Attorney, Agent, or Firm* — Procopio Cory Hargreaves & Savitch LLP

(57) ABSTRACT

A pressure-balanced enclosure for subsea use, and in particular for use as a submersible junction box in which subsea cables can be joined. The apparatus maintains a balanced pressure within the termination chamber; it is field installable, testable, and repairable. The termination chamber is not oil-filled; instead, it is substantially filled with a solid particulate fill material which includes a portion of elastomeric material.

12 Claims, 6 Drawing Sheets

(56) References Cited

U.S. PATENT DOCUMENTS

| | | | |
|---|---|---|---|
| 4,767,173 A * | 8/1988 | Priaroggia | 385/69 |
| 4,776,888 A | 10/1988 | Morrow | |
| 5,183,966 A | 2/1993 | Hurtado et al. | |
| 5,282,895 A | 2/1994 | Phillips | |
| 5,577,926 A | 11/1996 | Cox | |
| 5,698,615 A | 12/1997 | Polle | |
| 5,734,125 A | 3/1998 | Yasukuni et al. | |
| 5,755,863 A | 5/1998 | Morrow | |
| 5,762,847 A | 6/1998 | Kamps et al. | |
| 5,772,457 A | 6/1998 | Cairns | |
| 5,867,451 A | 2/1999 | Chang | |
| 6,095,838 A | 8/2000 | Brickett | |
| 6,200,152 B1 | 3/2001 | Hopper | |
| 6,321,021 B1 | 11/2001 | Cairns et al. | |
| 6,510,270 B1 | 1/2003 | Toth et al. | |
| 6,796,821 B2 | 9/2004 | Cairns et al. | |
| 6,822,018 B2 | 11/2004 | Chaudhuri et al. | |
| 6,910,904 B2 | 6/2005 | Herrick et al. | |
| 7,520,768 B2 * | 4/2009 | Nicholson | 439/190 |
| 7,690,936 B1 | 4/2010 | Snekkevik et al. | |
| 7,736,158 B2 | 6/2010 | Yamaguchi | |
| 7,763,796 B2 | 7/2010 | Yamane | |
| 8,015,998 B2 | 9/2011 | Harris | |
| 8,192,089 B2 | 6/2012 | Cairns et al. | |
| 2002/0129945 A1 * | 9/2002 | Brewer et al. | 166/381 |
| 2003/0199201 A1 | 10/2003 | Mullaney et al. | |
| 2004/0262008 A1 | 12/2004 | Deans et al. | |
| 2006/0124339 A1 * | 6/2006 | Goehlich | 174/74 R |
| 2006/0262647 A1 | 11/2006 | Thornton et al. | |
| 2009/0003785 A1 | 1/2009 | Parris et al. | |
| 2009/0080837 A1 | 3/2009 | Baxter et al. | |
| 2009/0250235 A1 * | 10/2009 | Gladd et al. | 174/34 |
| 2010/0035452 A1 | 2/2010 | Mudge, III et al. | |
| 2010/0258323 A1 * | 10/2010 | Varkey et al. | 166/385 |
| 2013/0044983 A1 | 2/2013 | Nagengast et al. | |
| 2013/0183003 A1 | 7/2013 | Cairns | |

FOREIGN PATENT DOCUMENTS

| | | | | |
|---|---|---|---|---|
| JP | 407051390 | * | 2/1995 | A61B 5/03 |
| WO | 2008/113026 A1 | | 9/2008 | |
| WO | 2013/109301 A1 | | 7/2013 | |

OTHER PUBLICATIONS

Zhi et al. "Towards Thermoconducive, Electrically Insulating Polymeric Composites with Boron Nitride Nanotubes as Fillers." Advanced Functional Materials. 19:1857-1862 (2009).

International Search Report and Written Opinion for PCT/US2014/021764 mailed on Jul. 7, 2014 in 12 pages.

* cited by examiner

PRESSURE-BALANCED SUBSEA ENCLOSURE WITH ELASTOMERIC FILL MATERIAL

FIELD OF THE INVENTION

Embodiments of the invention generally relate to an apparatus and method for providing a pressure-balanced enclosure for subsea use, and in particular for use as a submersible junction box in which subsea cables can be joined.

BACKGROUND OF THE INVENTION

There are many uses for sealed, pressure-balanced enclosures in the offshore industries, such as for housing sensors, batteries, and other sorts of apparatus that must be deployed at depth while not being directly exposed to the seawater itself. As one practical example, such enclosures are frequently used as subsea junction boxes. Components are typically joined within such junction-boxes while they are open. The enclosures are then closed and sealed prior to submersion in order to prohibit the intrusion of seawater. There are two broad existing categories of subsea junction boxes. One category comprises a gas-filled compartment in which various components are joined. The compartment pressure remains substantially at one atmosphere. This category of junction box must have very heavy walls and high-pressure seals to withstand the enormous pressure at great depth. In a second existing category of subsea junction boxes, the enclosure in which various components are joined, hereinafter called the termination chamber, is filled with oil that is pressure-balanced to the ambient sea pressure by a compensator. The walls and seals of these pressure-balanced junction boxes can be much less robust than those of the gas-filled junction boxes because there are no high-pressure differentials between the termination chamber and the exterior environment.

Subsea junction boxes are often used to join two or more subsea cables; or to join one or more cables to underwater connectors, or to other devices; or to join two or more devices without cables. At times they are used as "smart boxes" which join attachment points of a single device, such as an underwater connector or cable, to sensors, batteries, or other devices within the termination chamber.

When cables are joined to a junction box sometimes the cable-to-junction-box joint is connectorized, meaning that the cable does not actually penetrate the termination chamber, but instead is joined to it by way of a connector which passes through the termination chamber wall. In other common applications, the cable's bitter end itself actually penetrates the termination chamber. An underwater cable is essentially a long, thin pressure vessel in which there are voids, such as the interstices between twisted wire strands or between various other cable elements, which are nominally at one atmosphere pressure even when the cable is submerged to great depths. Prior-art termination chambers are typically filled with dielectric oil after the conductors within the chamber are attached to their respective attachment points. Oil is chosen due to the attributes that it is electrically isolative; it is able to evenly transmit the exterior ambient pressure to the interior portions of the chamber volume; and, it can be easily removed for maintenance and repair of the elements within the chamber. The oil pressure within the chamber is possibly very high depending upon its depth in the water. Therefore there can be a large pressure difference between the oil in the termination chamber and the cable interstices. Oil can undesirably flow into interstitial voids in the cable in case of nicks, pinholes, or other small perforations through the conductor jackets or, as described below, through boot seals.

Boot seals are frequently used to seal cable interfaces from the environment exterior to them. A generic example of a boot seal is shown in FIG. 4. Simple jacketed cable 36 in the example has a single, jacketed conductor 37. A first elastomeric boot-seal sleeve portion 38 is stretched over jacketed cable 36, and a second smaller elastomeric boot-seal sleeve portion 39 stretches over jacketed conductor 37. Pressure applied to the exterior of the FIG. 4 boot seal simply adds to the constrictive pressure of the elastomeric stretch, and enhances the seal between the boot seal and the elements of the cable. Boot seals such as shown in FIG. 4 are one-way seals. That is, they seal against intrusion of the exterior environment into the interface 40 between cable elements 36 and 37. But if there is an overpressure within cable interface 40, such as would occur with pressurized gas, water, or gel within interface 40, the overpressure could blow the boot seal axially away from the interface, or simply unseat sleeve 38 or 39.

Subsea cables are often so large that they cannot be practically transported to a place where they can be terminated in a laboratory-like environment; they must be terminated in the field. Therefore, there is often a need in the offshore industries for cable-to-connector junctions that can be installed, tested, and repaired in the field prior to immersion. Cables for subsea use commonly consist of an exterior jacket which houses a variety of individually jacketed electrical conductors and/or optical fibers within an inner core. The electrical conductors usually consist of stranded wires. In a typical termination process, the cable exterior jacket and core are cut back exposing lengths of the individually jacketed conductors. In the case of a cable carrying optical fibers within tubular conduits, tube-end-seal assemblies such as the example described in U.S. Pat. No. 6,321,021 to Cairns et al. ("the '021 patent"), the contents of which are included herein by reference, provide sealed barriers between the chamber volume and the interior portion of the fiber-carrying tubular conduits.

U.S. Pat. No. 5,577,926 to Cox ("the '926 patent"), the contents of which are incorporated herein by reference, describes a prior art arrangement. In the '926 patent, a cable is sealably joined mechanically to a junction box whose termination chamber houses the end of the cable core and the exposed conductors. The chamber is filled with dielectric oil. Boot seals are stretched across the joints between the core and the jackets of the exposed lengths of conductors thereby sealing those interfaces to prevent oil from entering the cable. The exposed conductors go further on within the oil chamber to eventually join to other conductors or to the attachment points of connectors or other devices. All joints between the conductors and attachment points are also sealed by boot seals. As a result, there are usually many seals and exposed, jacketed conductors within the oil-filled chamber. When completely installed, a compensator, such as a flexible portion of the chamber wall, allows the pressure within the oil to closely match that of the outside environment. Under pressure any perforations through the boot seals or conductor jackets will cause the chamber oil to be forced into the cable interstices. The chamber walls will then either collapse or rupture, allowing seawater to enter, and creating a catastrophic failure.

Another failure mode can occur when gel-filled cables are employed. In this mode, as cables are passed over handling devices such as pulleys, the gel can be "milked" toward the oil-filled termination chamber. That can unseat boot seals and result in subsequent failure. Still another failure mode, occurs when a cable is retrieved quickly from great depths. In this case pressurized gas expands within the cable, and seals within the oil-filled chamber can be temporarily or permanently unseated, allowing chamber oil to enter the cable interstices. Failure can also occur when the cable is under axial compression, as can happen during handling. In this case, if not arrested properly, the cable can piston into the oil-filled chamber and destroy the inner works.

U.S. Pat. No. 6,796,821 to Cairns et al. ("the '821 patent"), the contents of which are incorporated herein by reference, describes another prior art arrangement. Unlike arrangements prior to it, exemplified by the '926 patent, the '821 patent termination has separate first and second termination chambers intended, as discussed in the specification of the '821 patent, to obviate the aforementioned failure modes by providing an impenetrable barrier between a first chamber, and a second chamber which is filled with oil. The individual cable conductors are terminated in the first chamber to sealed penetrators which pass through the impenetrable barrier and onward into the second, oil-filled, chamber. The '821 patent discloses three basic embodiments: One with a first chamber filled with a cast, solid material, and maintained at one atmosphere pressure; one with a first chamber filled with a cast, solid material, and pressure compensated with grease to the ambient working pressure; and, one with a first chamber filled entirely with grease and compensated to the ambient working pressure. In all three embodiments the second chamber is oil-filled and pressure compensated to the ambient working pressure.

In the first two aforementioned embodiments of the '821 patent termination, once the conductors are terminated to attachment points on the impenetrable barrier the first chamber is filled with a pourable material which cures to a solid.

In the third aforementioned mentioned '821 patent embodiment, the first chamber is not filled with solid material, but rather is grease filled; and incorporates a compensator mechanism that balances the pressure within the grease to the ambient working pressure. Therefore, the first chamber in this third embodiment has all of the attributes of the earlier technology comprising only an oil-filled, pressure-balanced termination chamber.

In early art exemplified by the '926 patent, cable conductors extending outward from the core were exposed in a single oil-filled termination chamber and therein connected to the attachment points of connectors or other devices. All interfaces presenting potential leak paths of the oil into the cable were sealed with boot seals. The terminations were first completed up to the point of filling the chamber with oil. Next a method such as gas leak testing was employed to find any leaks from the chamber into the cable, or between the chamber and the exterior environment. If leaks were found, the termination could be easily dismantled for repair and retesting. Also at the point prior to oil filling, the quality of electrical and/or optical circuits could be tested, and if necessary, repaired. Even after oil filling, if defects were found in the termination, the oil could be drained, and repairs made. That is not the case with the '821 patent termination. Once the solid filler is installed into the first chamber, that portion can no longer be non-destructively disassembled for repair, nor can it be leak tested against water ingression. The solid filler embodiments of the '821 patent are, therefore, not completely testable or repairable in the field.

A subsea termination chamber has two fundamental requirements of a fill material: one, that it will transmit the ambient exterior pressure uniformly within the chamber; and two, that it will not escape. Filling the termination chamber with fluid satisfies the first of these requirements, but can fail the second.

SUMMARY OF THE INVENTION

According to first disclosed embodiment, a subsea enclosure is provided which can be installed, tested, and if necessary, repaired in the field prior to immersion. For simplicity the invented enclosure is described herein in terms of a termination assembly that joins one subsea cable to one submersible connector. Although the embodiments are disclosed in those elementary terms, it will be obvious that the invention can be used to house a wide variety of apparatus, and when used as a subsea junction-box termination assembly it can be configured for joining a wide variety, size, and number of diverse components. The chosen example contains all of the basic elements and challenges of larger, more complex enclosure assemblies.

Embodiments of the invention maintain a balanced pressure within the termination chamber; it is field installable, testable, and repairable. The termination chamber, according to embodiments of the invention, is not oil-filled; instead, it is substantially filled with a fill material which includes particulate elastomeric material.

BRIEF DESCRIPTION OF THE DRAWINGS

The details of embodiments of the invention, both as to its structure and operation, may be gleaned in part by study of the accompanying drawings, in which like reference numerals refer to like parts, and in which.

DETAILED DESCRIPTION OF THE INVENTION

Figure 1A:
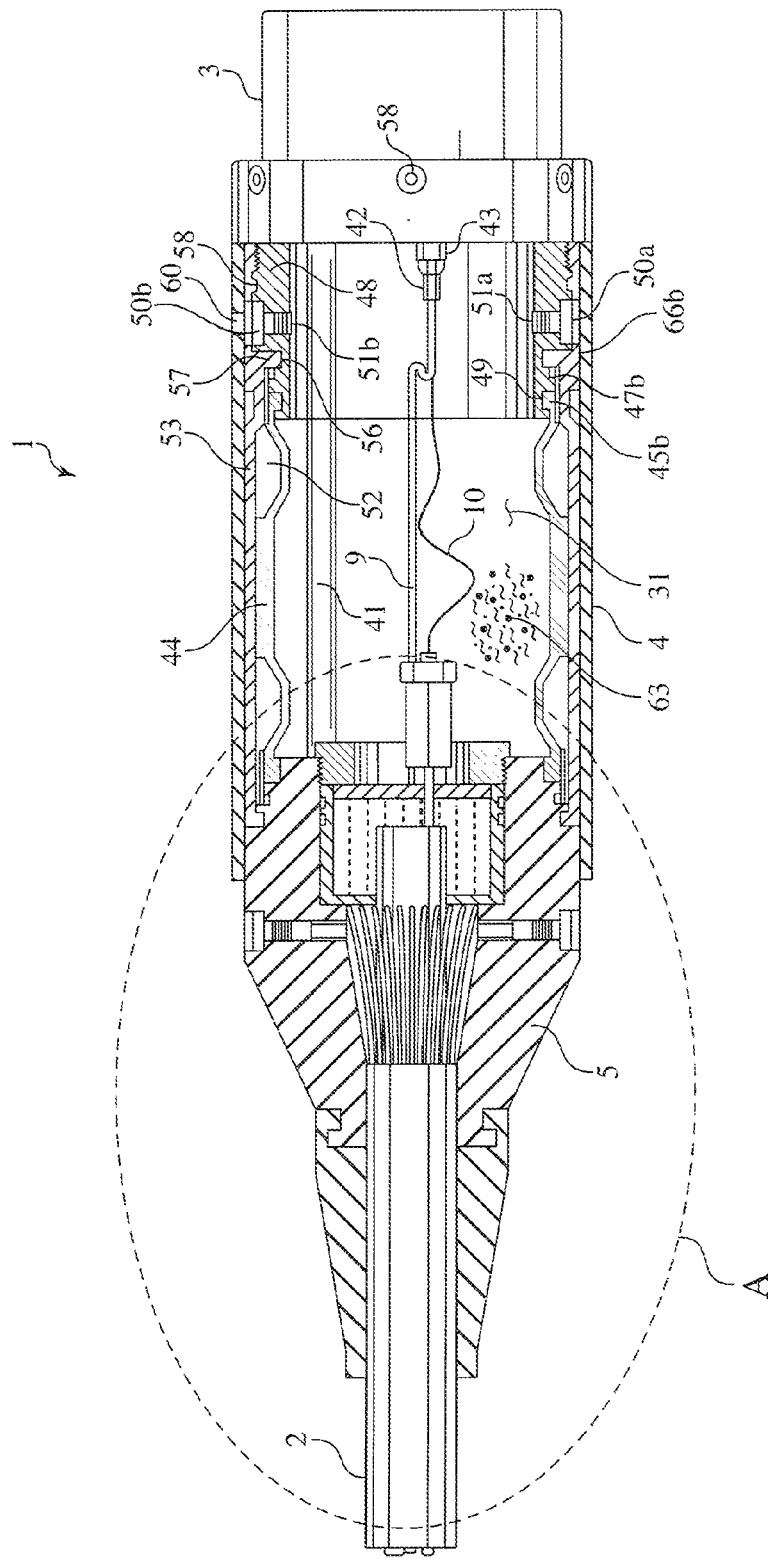
FIG. 1A is an axial partially-sectioned view of a subsea junction box configured as a typical cable terminated to an underwater connector.

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the invention. However, because such elements are known in the art, and because they do not facilitate a better understanding of the present invention, a discussion of such elements is not provided herein. The detailed description will be provided herein below with reference to the attached drawings.

For purposes of the description hereinafter, the terms "upper", "lower", "vertical", "horizontal", "axial", "top", "bottom", and derivatives thereof shall relate to the invention, as it is oriented in the drawings. However, it is to be understood that the invention may assume various alternative configurations except where expressly specified to the contrary. It is also to be understood that the specific elements illustrated in the drawings and described in the following specification are simply exemplary embodiments of the invention. Therefore, specific dimensions, orientations and other physical characteristics related to the embodiments disclosed herein are not to be considered limiting.

Figure 1B:
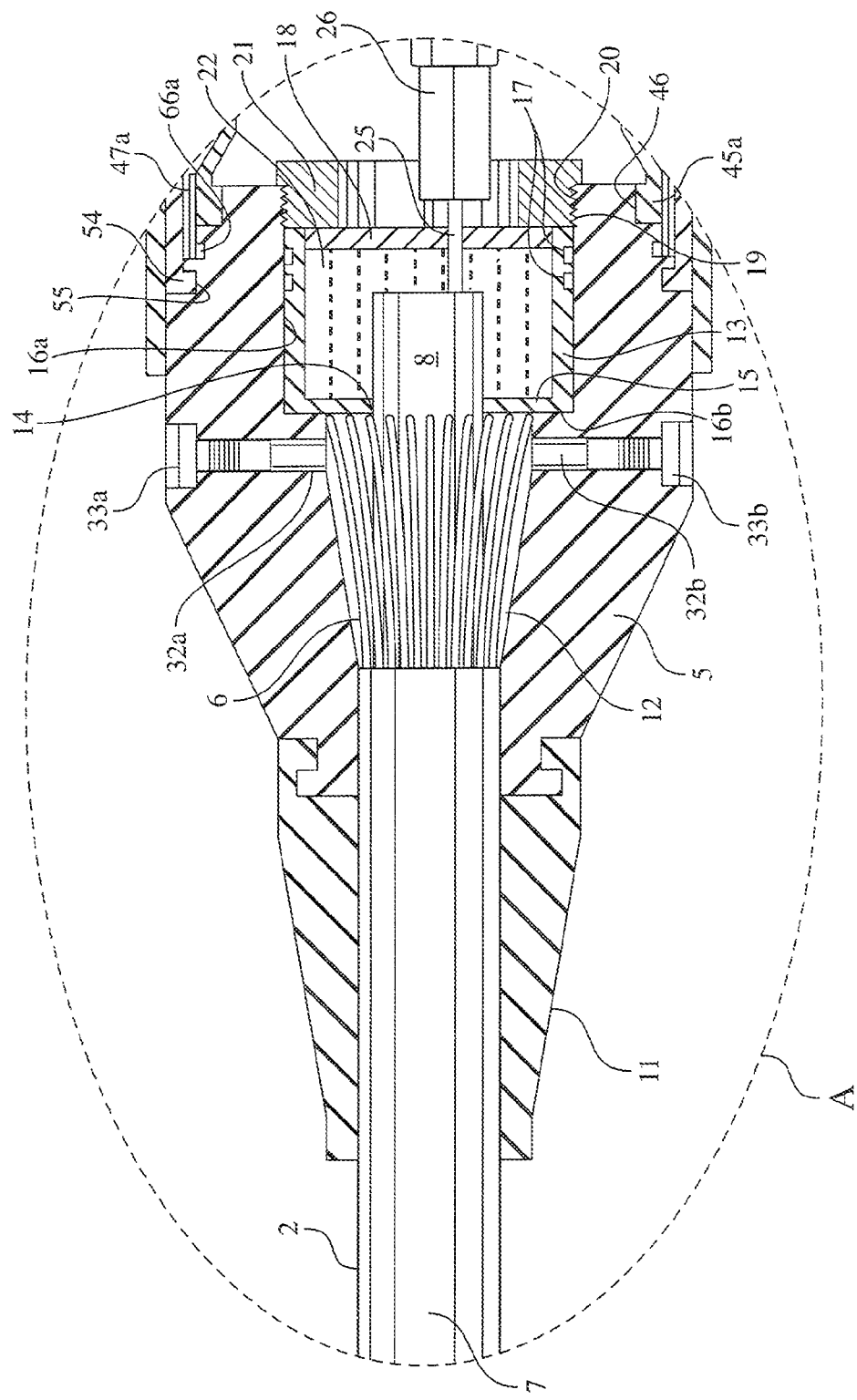
FIG. 1B is a close-up view of a portion of FIG. 1A.

FIGS. 1A and 1B illustrate an embodiment of a junction box 1 configured as a simple assembly to terminate one armored cable 2 to one underwater connector 3. The assembly comprises a cylindrical housing defined by an exterior shell 4 which is closed by a cable union 5 on its posterior end, and by a submersible connector 3 on its anterior end. Cable 2 is a subsea armored cable including an exterior jacket 7 cut back to expose fanned-out armor wires 6, internal core 8, one or more jacketed electrical conductors 9 (one of which is shown), and one or more optical fibers 10 (one of which is shown). Elastomeric boot seal 11 acts both as a cable strain relief, and to seal the interface between cable jacket 7 and cable union 5. Conical seat 12 in cable union 5 accommodates fanned-out armor wires 6. Cup-shaped housing 13 comprises through-bore 14 that fits closely to the outer surface of cable core 8, and further comprises rear wall 15 that forms a mechanical barrier between conical seat 12 and the interior of cup-shaped housing 13. Bore 16 in cable union 5 sealably accommodates cup-shaped housing 13 with o-ring seals 17. Housing end-cap 18 fits snugly into the anterior end of cup-shaped housing 13. Engagement threads 19 in the anterior end of cable union 5 engage threads 20 on retainer nut 21, thereby capturing cup-shaped housing 13 and housing end-cap 18 within bore 16 of cable union 5.

Figure 2:
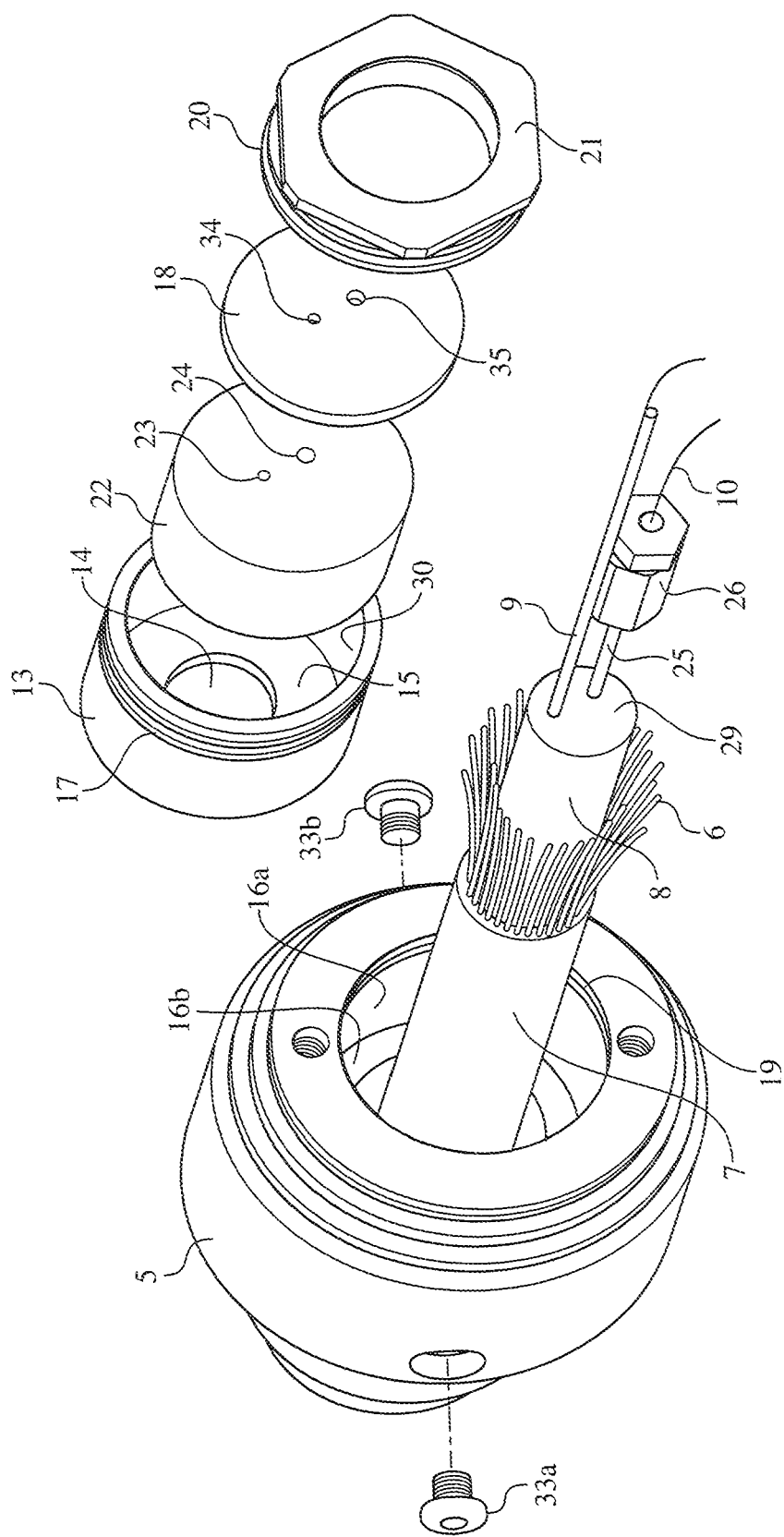
FIG. 2 is an exploded view of the posterior portion of the cable termination.
Figure 3:
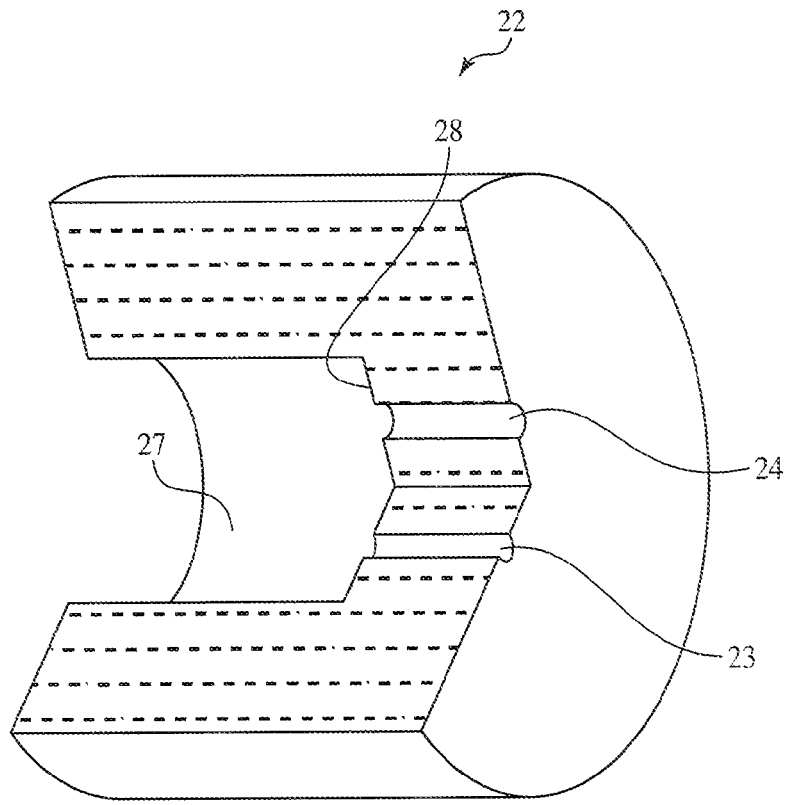
FIG. 3 is an axial partially-sectioned view of a break-out gland seal.

FIG. 2 is an exploded view of the mechanical junction between the cable and the termination chamber. Elastomeric gland seal 22 (FIGS. 2 & 3) has a slightly larger diameter than bore 30 of cup-shaped housing 13 into which it is squeeze-fit. Large bore 27 in the posterior portion of gland seal 22 is stretch fit over cable core 8. Forward wall 28 of bore 27 within gland seal 22 (FIG. 3) cooperates with front face 29 of cable core 8 to arrest the forward motion of the cable core with respect to the gland seal. One or more bores 23 through the anterior end portion of gland seal 22 stretch-fit respectively to the one or more jacketed electrical conductors 9 which pass through them. Similarly, one or more bores 24 stretch fit to the respective one or more optical-fiber conduits 25, each of the conduits housing one or more optical fibers 10. Gland seal 22 is slightly shorter axially than the cavity formed by bore 30 of cup-shaped housing 13 and housing end-cap 18, thereby allowing elastomeric gland seal 22 to elongate axially as it is squeezed radially during insertion. Retainer nut 21 attaches to the anterior portion of cable union 5 through the engagement of housing-nut threads 20 with threads 19 of cable union 5, thereby fixing cup-shaped housing 13, gland seal 22, and housing end-cap 18 within bore 16a of the cable union 5. The rearward motion of captured elements 13, 22, and 18 is limited by shoulder 16b of cable union 5.

One or more conduits 25 each housing respective one or more optical fibers 10 are sealably terminated by respective one or more feed-through units 26 which may function in a manner similar to the sealed feed-through described in aforementioned U.S. Pat. No. 6,321,021 of Cairns, et al.

It is to be noted that in embodiments of the invention there are no boot seals on the interfaces between the various elements of cable 2 and the interior of termination chamber 31; instead, the sealing of these interfaces is accomplished entirely by gland seal 22. That is advantageous because boot seals typically have relatively thin walls, and are more easily subject to perforations. Also, mobile elements within the cable such as gas, gel, or intruded water could unseat boot seals. Also, if the pressure of the mobile elements within the cable would exceed the chamber pressure, the boot seals could be unseated. However, these will not unseat gland seal 22. Therefore, in the construction just described termination chamber 31 is sealed on all levels against the ingress of foreign substances from the cable, and likewise cable 2 is sealed against the intrusion of mobile material from the termination chamber. Gland seal 22 is, therefore, bidirectional as it seals in both directions.

One or more through-bores 34 of housing end cap 18 fit snugly to the one or more respective jacketed electrical conductors 9, but do not seal to those conductors. Similarly, one or more through-bores 35 of housing end cap 18 fit snugly to the one or more respective optical fiber conduits 25, but do not seal to those conduits. Therefore, gland seal 22 is not sealed from termination chamber 31, and is substantially balanced to the pressure of the termination chamber; which chamber, in turn, is balanced to the ambient pressure of the working environment. There is, therefore, no substantial pressure difference between the cable end portion and either gland seal 22 or termination chamber 31, and as a result, there are no substantial pressure-related forces urging the cable into chamber 31.

There may be other handling forces that urge cable 2 inward toward termination chamber 31. But due to the solid barrier presented by housing end-cap 18 and housing nut 21, cable 2 cannot piston into termination chamber 31.

As shown in FIGS. 1A and 1B, conical seat 12 of cable union 5 houses the fanned-out armor wires 6 of cable 2. Once in place, the cavity formed by conical seat 12 is filled by way of ports 32a, 32b with a pourable epoxy that cures to a solid, thereby gripping the armor wires of cable 2 and prohibiting the axial withdrawal of the cable from cable union 5 even in the presence of high tension. Seal screws 33a, 33b subsequently seal fill ports 32a, 33b. Irregularities (not shown) in conical seat 12 prohibit the rotation of cable 12 with respect to cable union 5. This sort of epoxy-poured strength-termination is old art, well known to those in the field. As pointed out in aforementioned '821 patent there are many types of submarine cables and many types of existing arrangements to mechanically grip the ends of cables to be terminated. Adaptations to cable union 5 can readily be envisioned to accommodate various other types of cable grips while not diminishing the effectiveness of embodiments of the invention's sealing and anti-pistoning arrangements.

Figure 4:
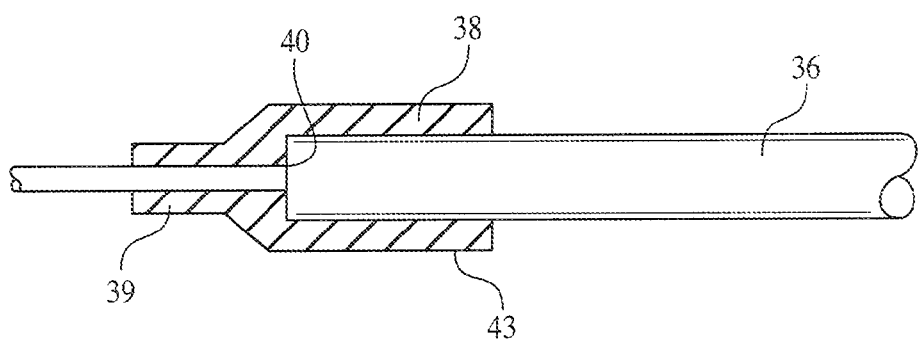
FIG. 4 is an axial partially-sectioned view of a prior art boot seal.

The preliminary stages of the termination assembly go as follows: (1) Elements of the mechanical cable junction (FIG. 2) are assembled onto the prepared cable end; (2) conical seat 12 is filled with epoxy, and seal screws 33a, 33b are installed. (3) Stand-off rods 41 (one of which is shown in FIG. 1A) are installed to keep the mechanical cable junction (FIGS. 1A, 1B and 2) and connector 3 fixed in relative axial and rotational position during the rest of the assembly. (4) One or more jacketed electrical conductors 9 are attached to their respective attachment points (hidden in FIG. 1A) and boot seals 43, similar to the generic example of FIG. 4, are installed over the attachment points. (5) One or more optical fibers 10 are attached to their respective one or more attachment points (hidden in FIG. 1B) and protective strain relief boots 42 are installed over the attachment points. At this stage of installation, all circuits between the cable and the connector have been completed, and can be preliminarily tested.

Figure 7:
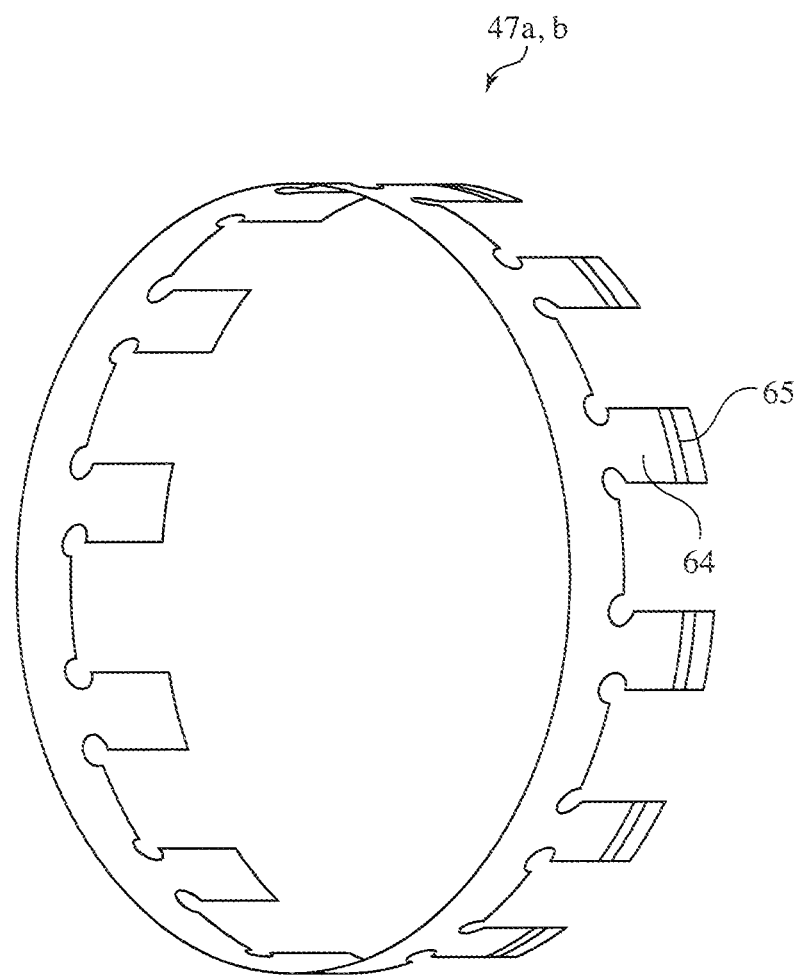
FIG. 7 is a perspective view of the inner chamber wall retainer band.

The posterior end of elastomeric inner chamber wall 44 attaches sealably to cable union 5 by the cooperation of inward-facing shoulder 45a of the inner chamber wall with cable-union groove 46, the shoulder being retained within the groove by retainer sleeve 47a (FIGS. 1B and 7). The anterior end of inner chamber wall 44 attaches sealably to rearward extension 48 of connector 3 by the cooperation of inward-facing shoulder 45b of the inner chamber wall with groove 49 of the rearward extension, shoulder 45b being retained within groove 49 by retainer sleeve 47b (FIGS. 1A and 7). Tines 64 (FIG. 7) of retainer sleeves 47a, 47b have inward projecting ribs 65 that lock into grooves 66a, 66b (FIGS. 1B and 1A) of cable union 5 and rearward extension 48 of connector 3. Inner chamber wall 44 has a flexible portion which acts a pressure compensator for pressurizing the chamber 31. Once inner chamber wall 44 has been installed, preliminary low-pressure gas testing of the now-sealed assembly can be performed by introducing gas through one of ports 51a, 51b. After successful preliminary gas testing, inner chamber 31 is filled with fill material 63 via ports 51a, 51b, which are subsequently sealed by respective seal screws 50a, 50b.

Unlike the oil used in prior art arrangements, fill material 63 is composed of a mixture of small, substantially incompressible particles. The fill material can be made from a wide variety and/or mixture of materials with appropriate attributes. According to embodiments of the invention fill material 63 is selected from material having the following characteristics:

A substantial amount of the fill material will not leak out of the chamber in the event of perforations or defects in the barriers that seal it from the cable interstices;

The fill material uniformly transmits the external ambient pressure to the innermost reaches of the chamber;

The fill material is chemically compatible with the other elements which it contacts within the termination chamber, and with seawater;

The fill material is not soluble or miscible in any fluids with which it comes into contact, including seawater;

The fill material contains some particles whose size scale is greater than that of the leakage paths. These particles could be small fibers, spheres, ribbons, grains, powder or platelets, for instance, whose size scales are greater than the openings of potential leak paths;

The fill material does not contain only particles whose size scale is comparable to or larger than those of other termination components such as seals or conductors, because such large particles in the absence of smaller filler particles would cause discreet pressure points on those components. That is particularly important in the case where optical fibers are present. (Single-mode optical fibers typically have a diameter of 125 microns (1 micron=$10^{-6}$ meter)). Therefore, the fill material contains a substantial fraction of particles whose size scales are small compared to the smallest diameter of the conductors within the material;

In the case where there are electrical conductors within the chamber, the fill material is substantially electrically non-conductive;

The fill material in bulk is at most only slightly compressible; and

The fill material is easily installable and removable for maintenance and testing.

Shear strength is an inverse indicator of a material's ability to flow. The shear strength of particulate material increases with increasing applied pressure causing the material to flow less easily. That in itself is not detrimental to particulate material's utility as a termination-chamber fill material. Pressure changes affecting subsea termination chambers are not sudden impacts, but instead occur slowly; so as long as the fill material can flow, it will transmit the external pressure into the innermost reaches of the termination chamber. The solid and elastomeric particles used as fill material must on one hand be fine enough so as not to cause pressure points on the other termination components such as optical fibers, and on the other hand must be coarse enough to prevent it from leaking out through perforations or other flaws in the conductor jackets or boot seals. In many circumstances, for example when all potential leak paths are very small, a fill material of one particle size fulfills these requirements. But in some other applications, it is desirable to have a filler mix containing diverse particle sizes and/or shapes.

The combination and size of the elements comprising the fill material will therefore vary according to the particular application. Some suggested materials are given in the following example, however many material choices are available that would work equally well. In an application wherein the termination chamber contains both optical fibers and stranded, jacketed electrical conductors the fill material (63 in FIG. 1) could include: a substantial fraction of elastomeric, non-cohesive material to prevent caking of the fill material as might occur if only powdered inelastic material were used, plus a fraction of inelastic particles to increase the pressure withstanding properties of the mix: for example, a fill mixture of ¼ powdered glass fibers having particles with an average diameter of 16 µm, and average length 470 µm, and ¾ powdered rubber of average size scale 75 µm. Such a mixture blocks a bore of 500 µm diameter against leakage at high differential pressures. The rubber is, for example, a micronized Nitrile rubber with, for example, Shore-A durometer of 70 to 90. The micronizing of the rubber could be accomplished, by example, by grinding chunks of cured rubber into a fine powder of irregular particles. When dry, such Nitrile powder is non-cohesive and free flowing. It is perhaps unexpected that the passage through a bore whose diameter is somewhat larger than the largest of the elements that are urged to pass through it is blocked by those elements; but that is the case. The addition of inelastic elements, such as the abovementioned glass fibers, to the elastomeric particle mixture increases the differential withstanding pressure across the leak path by creating small structural elements, or bridges, within the mixture.

The elastomeric particles in the fill mix by definition have an elastic restoring force. When pressed together by a high pressure, they will elastically conform to other particles within the mix. But when the pressure is released, they will likewise elastically return to their un-pressurized forms, and will not become coherent.

A wide variety of fill mixtures can be utilized, depending on the application. The mixture must function to seal leak paths of the size that are expected, and at the pressure to which the assembly is exposed. In particular, a simple fill mix comprised entirely of elastomeric particles would work in many applications. The mixture would contain a substantial fraction of particles with size scales larger than the leak paths it is expected to block.

The invention's fill material is dry; no fluid component is needed. If water were to inadvertently intrude into the elastomeric mixture, the mixture would be wetted, with some accompanying loss of electrical resistivity. Water could, in fact, be forced through the fill material and into the leak path which is blocked to the passage of the powder. But the elastomeric powder itself would remain in place. It does not become pasty; but instead remains non-cohesive.

Every precaution is made to block intrusion of external environmental contamination into termination inner chamber 31. If a fluid contaminant would accidentally intrude into chamber 31, for instance from ruptures in both of the external chamber walls, it would most likely permeate a completely dry fill material, thereby possibly somewhat degrading its electrical resistivity; but the chamber would not collapse, and catastrophic failure would not occur.

Except for the invention of U.S. application Ser. No. 13/473,783, prior art termination chambers are completely filled with oil, allowing the ambient external pressure to be transmitted throughout the entire chamber volume. The invention's fill material 63 is also able to evenly transmit the exterior ambient pressure to the innermost portions of the chamber volume; and like the oil, it can easily be removed for maintenance and repair of the elements within the chamber. But unlike oil-filled terminations, perforations through the boot seals or conductor jackets will not force any substantial amount of the invention's chamber fill material into the cable interstices. The chamber walls therefore will not collapse or rupture due to such flaws, and catastrophic failure will not occur.

Figure 5:
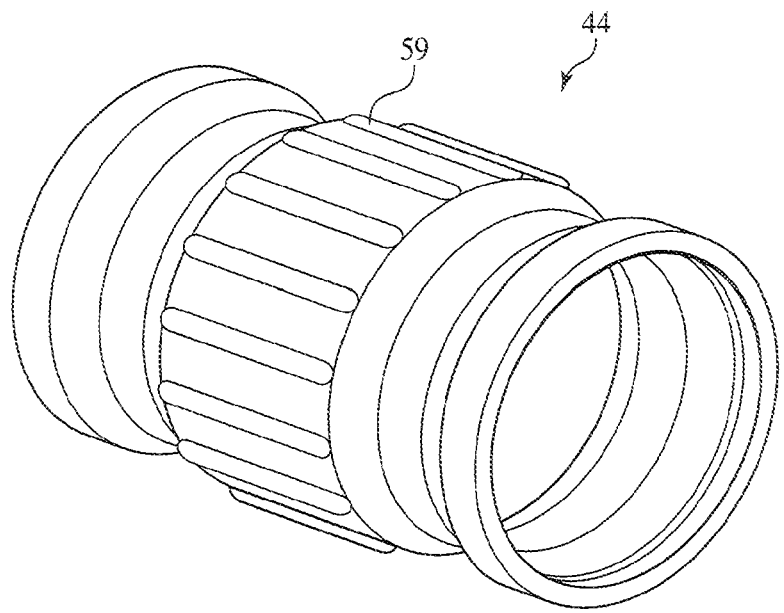
FIG. 5 is a perspective view of the inner chamber wall.
Figure 6:
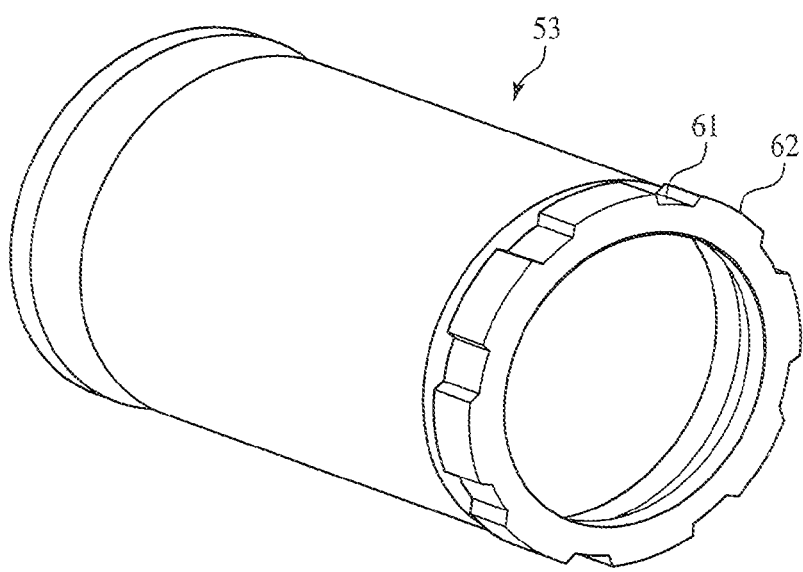
FIG. 6 is a perspective view of the outer chamber wall.

As shown in FIG. 1A, outer chamber elastomeric wall 53 surrounds inner elastomeric chamber wall 44. The posterior end of outer chamber wall 53 attaches sealably to cable union 5 by the cooperation of inward-facing shoulder 54 of the outer chamber wall with cable-union groove 55, the shoulder being retained within the groove by exterior shell 4. The anterior end of outer chamber wall 53 attaches sealably to rearward extension 48 of connector 3 by the cooperation of inward-facing shoulder 57 of outer chamber wall 53 with groove 56 of rearward extension 48, the shoulder being retained within the groove by exterior shell 4. Annular volume 52 between outer chamber wall 53 and inner chamber wall 44 is filled with a fill material having the same requirements as fill material 63. Ribs 59 (FIG. 5) on the exterior surface of inner chamber wall 44 provide axial ventilation paths between inner chamber wall 44 and outer chamber wall 53. During the final stages of assembly, exterior shell 4, shown partially cut away in FIG. 1A, is slid from the rear over the posterior portion of outer chamber wall 53. Outer chamber-wall shoulder 57 is temporarily unseated from groove 56, providing an opening through which to fill volume 52. Once volume 52 is filled, exterior shell 4 is slid far enough forward to capture outer-wall shoulder 57 within groove 56, but not so far forward as to cover seal screws 50a, 50b. With exterior shell 4 in this position, higher-pressure gas testing of the assembly can be accomplished via ports 51a, 51b. Once testing and filling are complete, exterior shell 4 is slid forward into final position and attached by screws 58 to connector 3 and by similar screws (not shown) to cable union 5. Seawater (or whatever the exterior environment is) is free to enter the space between exterior shell 4 and outer chamber wall 53 via one or more ports 60 (one of which is shown) through outer shell 4. As shown in FIG. 6, axial ventilation between the interior of exterior shell 4 and outer chamber wall 53 is provided by grooves 61 between lands 62 on the anterior end of outer chamber wall 53.

Termination chamber 31 in the invention is well sealed against water intrusion from cable 2, as well as water intrusion from connector 3. But in the absence of outer chamber wall 53, a single perforation of inner chamber wall 44 would permit intrusion of seawater (or whatever the working environment is) into termination chamber 31. That would not be likely to result in a catastrophic failure, but it is to be avoided if possible. The addition of outer chamber wall 53 with the concomitant creation of annular volume 52 insures that a perforation of either one of outer wall 53 or inner wall 44 would not permit the intrusion of potentially harmful foreign material into termination chamber 31. Clearly, it would be possible to construct a working termination such as that just described that lacked one or the other of walls 44, 53, but such a device would be more prone to accidental damage and possible contamination as would the previously described two-walled embodiment.

Although the invention has been described in the context of a simple cable-to-connector junction by way of example only, it will be understood by those skilled in the art that modifications can be made to the disclosed embodiments without departure from the scope or spirit of the invention, which is defined by the appended claims. Accordingly, it is understood that the drawings and the descriptions herein are proffered only to facilitate comprehension of the invention and should not be construed to limit the scope thereof.

What is claimed is:

1. A pressure-balanced junction box for subsea use, comprising:
    a housing having a first end for sealably receiving an end of a subsea cable, and a second end;
    the housing having an outer wall and an internal chamber;
    the cable carrying at least one conductor, each conductor having an end extending into the internal chamber;
    a flowable fill material within the internal chamber, wherein the flowable fill material comprises a plurality of separately formed solid particles selected from the group consisting of fibers, spheres, ribbons, grains, powder and platelets, and the flowable fill material is selected to be flowable when the housing is immersed in a subsea environment and comprises a mixture of first particles of an inelastic, substantially incompressible material and second particles of an elastomeric, non-cohesive material; and
    a pressure compensator adapted for pressurizing the internal chamber.

2. The pressure-balanced junction box of claim 1, wherein the elastomeric material is powdered rubber.

3. The pressure-balanced junction box of claim 2, wherein the inelastic material is powdered glass fibers.

4. The pressure-balanced junction box of claim 1, wherein the at least one conductor is at least one optical fiber.

5. The pressure-balanced junction box of claim 1, wherein the at least one conductor is at least one electrical cable and at least one optical fiber.

6. The pressure-balanced junction box of claim 1, further comprising an inner chamber wall inside the outer wall of the housing and surrounding the internal chamber, and the pressure compensator comprises a flexible wall portion of the inner chamber wall.

7. The pressure-balanced junction box of claim 6, further comprising an outer chamber wall disposed between the inner chamber wall and the outer wall, forming a first space between the inner chamber wall and the outer chamber wall and a second space between the outer chamber wall and the outer wall.

8. The pressure-balanced junction box of claim 7, wherein a second fill material is disposed within the space between the inner chamber wall and the outer chamber wall.

9. The pressure-balanced junction box of claim 7, wherein the outer wall of the housing has at least one open port which communicates directly with said second space and is configured to allow seawater to enter said second space from the external subsea environment surrounding the housing and the outer chamber wall.

10. The pressure-balanced junction box of claim 1, wherein the first particles comprise glass fiber particles.

11. The pressure-balanced junction box of claim 10, wherein the glass fiber particles have an average diameter of 16 μm and an average length of 470 μm.

12. The pressure-balanced junction box of claim 11, wherein the second particles comprise powdered rubber particles having an average size scale of 75 μm.

* * * * *